(12) United States Patent
Nayyar et al.

(10) Patent No.: US 11,047,950 B2
(45) Date of Patent: *Jun. 29, 2021

(54) DISTRIBUTED RADAR SIGNAL PROCESSING IN A RADAR SYSTEM

(71) Applicant: Texas Instruments Incorporated, Dallas, TX (US)

(72) Inventors: Jasbir Singh Nayyar, Bangalore (IN); Brian Paul Ginsburg, Allen, TX (US); Sudipto Bose, Plano, TX (US); Murtaza Ali, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/815,622

(22) Filed: Mar. 11, 2020

(65) Prior Publication Data

US 2020/0225315 A1 Jul. 16, 2020

Related U.S. Application Data

(63) Continuation of application No. 14/633,647, filed on Feb. 27, 2015, now Pat. No. 10,627,480.

(Continued)

(51) Int. Cl.
*G01S 7/03* (2006.01)
*G01S 7/35* (2006.01)
(Continued)

(52) U.S. Cl.
CPC .......... *G01S 7/03* (2013.01); *G01S 7/352* (2013.01); *G01S 13/343* (2013.01); *G01S 13/42* (2013.01);
(Continued)

(58) Field of Classification Search
CPC ...... G01S 2007/356; G01S 7/03; G01S 7/285; G01S 2007/2883; G01S 7/292;
(Continued)

(56) References Cited

U.S. PATENT DOCUMENTS

| 4,529,984 A * | 7/1985 | Devolder | H03K 5/082 342/197 |
| 6,850,184 B1 * | 2/2005 | Desrochers | G01S 13/951 342/26 D |

(Continued)

FOREIGN PATENT DOCUMENTS

| CN | 103534605 A | 1/2014 |
| CN | 103592631 A | 2/2014 |

(Continued)

OTHER PUBLICATIONS

"Pulse-Doppler Signal Processing", Wikipedia, pp. 1-7, available at http://en.wikipedia.org/w/index.php?title=PulseDoppler_signal_processing&oldid=635348939, Nov. 25, 2014.

(Continued)

*Primary Examiner* — Vladimir Magloire
*Assistant Examiner* — Nuzhat Pervin
(74) *Attorney, Agent, or Firm* — Ebby Abraham; Charles A. Brill; Frank D. Cimino

(57) ABSTRACT

A cascaded radar system is provided that includes a first radar system-on-a-chip (SOC) operable to perform an initial portion of signal processing for object detection on digital beat signals generated by multiple receive channels of the radar SOC, a second radar SOC operable to perform the initial portion of signal processing for object detection on digital beat signals generated by multiple receive channels in the radar SOC, and a processing unit coupled to the first radar SOC and the second radar SOC to receive results of the initial portion of signal processing from each radar SOC, the (Continued)

processing unit operable to perform a remaining portion of the signal processing for object detection using these results.

10 Claims, 7 Drawing Sheets

Related U.S. Application Data

(60) Provisional application No. 62/025,748, filed on Jul. 17, 2014.

(51) Int. Cl.
| | | |
|---|---|---|
| G01S 13/42 | (2006.01) | |
| G01S 13/931 | (2020.01) | |
| G01S 13/34 | (2006.01) | |
| G01S 13/87 | (2006.01) | |

(52) U.S. Cl.
CPC ............ *G01S 13/87* (2013.01); *G01S 13/878* (2013.01); *G01S 13/931* (2013.01); *G01S 2007/356* (2013.01)

(58) Field of Classification Search
CPC . G01S 7/35; G01S 7/352; G01S 7/354; G01S 13/931; G01S 13/02; G01S 13/10; G01S 7/4004; G01S 7/4008; G01S 13/343; G01S 13/72; G01S 13/42; G01S 13/34; G01S 13/50; G01S 13/581–13/584; A61B 5/0205; H03M 1/1061; H04L 5/0062; H01Q 1/3233
USPC .......................................................... 342/70
See application file for complete search history.

(56) References Cited

U.S. PATENT DOCUMENTS

| | | | | |
|---|---|---|---|---|
| 7,753,849 | B2* | 7/2010 | Morgan | G01S 13/88 |
| | | | | 600/453 |
| 9,194,945 | B2* | 11/2015 | Stewart | G01S 13/10 |
| 9,306,722 | B2* | 4/2016 | Rangarajan | H04L 27/0006 |
| 9,476,973 | B2* | 10/2016 | Mazzaro | G01S 13/87 |
| 9,594,159 | B2* | 3/2017 | Wang | G01S 7/414 |
| 2003/0052813 | A1* | 3/2003 | Natsume | G01S 13/345 |
| | | | | 342/70 |
| 2009/0021421 | A1* | 1/2009 | Wakayama | G01S 7/354 |
| | | | | 342/175 |
| 2010/0171648 | A1* | 7/2010 | Himmelstoss | H03L 7/23 |
| | | | | 342/103 |
| 2012/0194377 | A1* | 8/2012 | Yukumatsu | G01S 7/35 |
| | | | | 342/70 |
| 2014/0085128 | A1* | 3/2014 | Kishigami | G01S 13/878 |
| | | | | 342/118 |
| 2014/0232576 | A1* | 8/2014 | Sim | H03M 1/0609 |
| | | | | 341/118 |
| 2014/0232586 | A1* | 8/2014 | Ygnace | G01S 7/354 |
| | | | | 342/59 |
| 2015/0153445 | A1* | 6/2015 | Jansen | G01S 7/032 |
| | | | | 701/93 |
| 2015/0346323 | A1* | 12/2015 | Kollmer | G01S 7/02 |
| | | | | 342/196 |
| 2016/0146931 | A1* | 5/2016 | Rao | H01Q 1/3233 |
| | | | | 342/59 |
| 2016/0187464 | A1* | 6/2016 | Ginsburg | G01S 7/4008 |
| | | | | 342/168 |
| 2016/0320482 | A1* | 11/2016 | Ling | G01S 7/412 |
| 2016/0334501 | A1* | 11/2016 | Ling | G01S 13/42 |

FOREIGN PATENT DOCUMENTS

| | | | | |
|---|---|---|---|---|
| CN | 104678366 A | 6/2015 | | |
| EP | 2 881 752 A1 | 6/2015 | | |
| EP | 2881752 A1 * | 6/2015 | .......... | B60W 30/143 |
| EP | 2881752 A1 | 6/2015 | | |
| WO | WO 2014/098693 A1 | 6/2014 | | |
| WO | WO-2014098693 A1 * | 6/2014 | .......... | G01S 7/4004 |
| WO | WO2014098693 A1 | 6/2014 | | |
| WO | WQ-2014098693 A1 * | 6/2014 | .......... | G01S 13/931 |
| WO | WO-2016011407 A1 * | 1/2016 | .............. | G01S 7/03 |
| WO | WO2016011407 A1 | 1/2016 | | |

OTHER PUBLICATIONS

Michael Klotz, "An Automotive Short Range High Resolution Pulse Radar Network", Technical University of Hamburg, Jan. 2002, pp. 1-139.
Donald E. Barrick, "FM/CW Radar Signals and Digital Processing", NOAA Technical Report ERL 283-WPL 26, U.S. Department of Commerce, National Oceanic and Atmospheric Administration, Environmental Research Laboratories, Boulder, CO, Jul. 1973, pp. 1-28.
Walter J. Alberhseim, "A Closed-Form Approximation to Robertson's Detection Characteristics", Proceedings of the IEEE, vol. 69, No. 7, Jul. 1981, p. 839.
Jurgen Hasch, et al, "Millimeter-Wave Technology for Automotive Radar Sensors in the 77 GHz Frequency Band", IEEE Transactions on Microwave Theory and Techniques, vol. 60, No. 3, Mar. 2012, pp. 845-860.
Notification of Transmittal of the International Search Report and the Written Opinion of the Ionternational Searching Authority, or the Declaration; PCT/US2015/040996; dated Oct. 15, 2015.
Notification of JP office action; dated Sep. 30, 2019; 4 pages.
Supplementary European Search Report; EP15822171; dated Jun. 13, 2018.
Notification of CN Office Action; dated Oct. 30, 2018; 2 pages.
Extended European Search Report; Application No./Pat. No. 20205312.0-1206; dated Feb. 24, 2021; 9 pages.

* cited by examiner

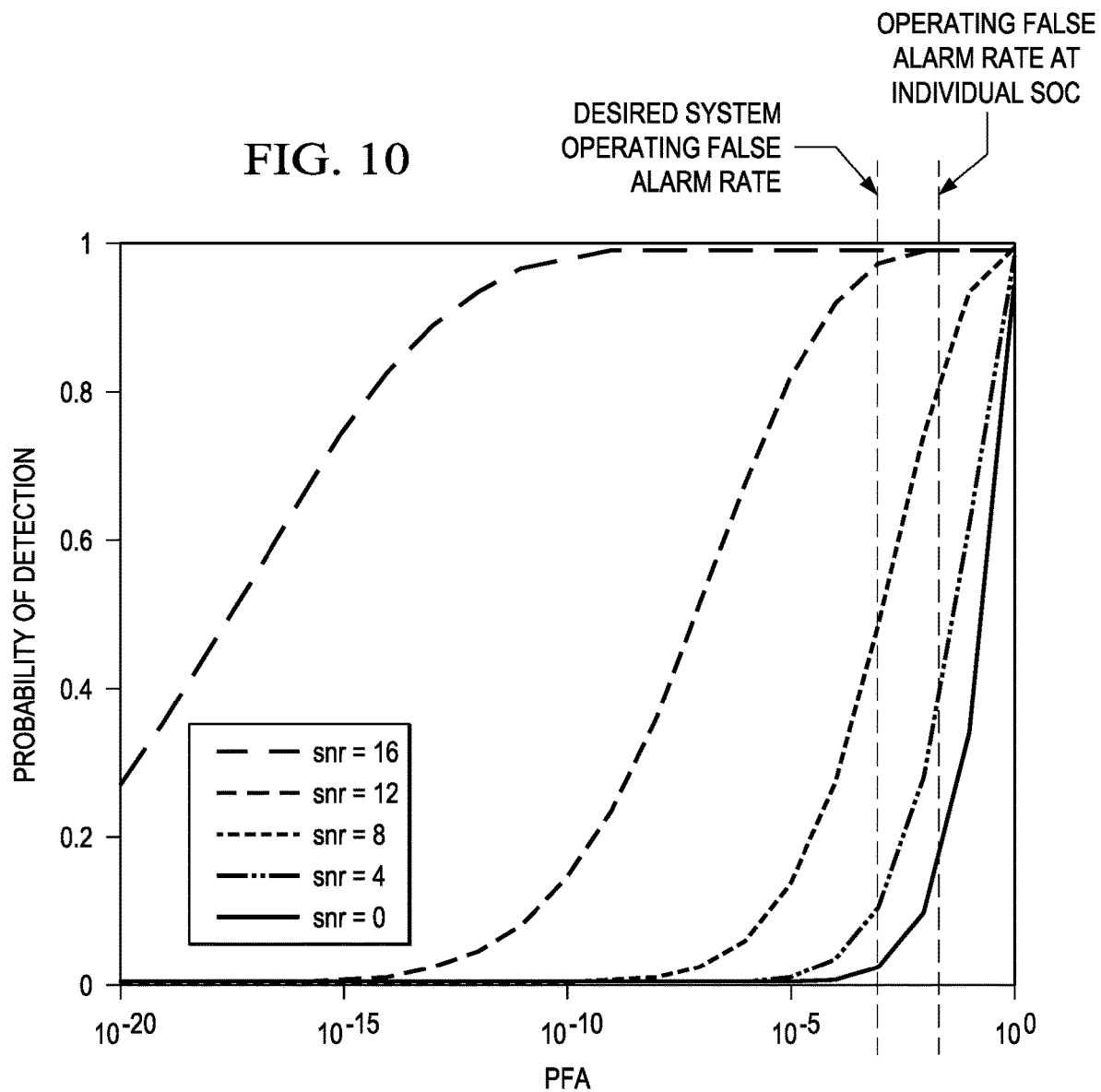

DISTRIBUTED RADAR SIGNAL PROCESSING IN A RADAR SYSTEM

CROSS-REFERENCE TO RELATED APPLICATIONS

This application is a continuation of U.S. patent application Ser. No. 14/633,647, filed Feb. 27, 2015, which claims benefit of U.S. Provisional Patent Application Ser. No. 62/025,748, filed Jul. 17, 2014, which is incorporated herein by reference in its entirety.

BACKGROUND OF THE DISCLOSURE

Field of the Disclosure

Embodiments of the present disclosure generally relate to radar systems, and more specifically relates to distributed processing of radar signals in a radar system.

Description of the Related Art

A new class of safety systems, referred to as advanced driver assistance systems (ADAS), has been introduced into automobiles to reduce human operation error. These systems are enabled by smart sensors based primarily on millimeter-wave automotive radars. The proliferation of such assistance systems, which may provide functionality such as rear-view facing cameras, electronic stability control, and vision-based pedestrian detection systems, has been enabled in part by improvements in microcontroller and sensor technologies. Enhanced embedded radar-based solutions are enabling complementary safety features for ADAS designers.

In an automotive radar system, one or more radar sensors may be used to detect obstacles around the vehicle and the speeds of the detected objects relative to the vehicle. A processing unit in the radar system may determine the appropriate action needed, e.g., to avoid a collision or to reduce collateral damage, based on signals generated by the radar sensors. Current automotive radar systems are capable of detecting objects and obstacles around a vehicle, the position of any detected objects and obstacles relative to the vehicle, and the speed of any detected objects and obstacles relative to the vehicle. Via the processing unit, the radar system may, for example, alert the vehicle driver about potential danger, prevent a collision by controlling the vehicle in a dangerous situation, take over partial control of the vehicle, or assist the driver with parking the vehicle.

Automotive radar systems often use frequency modulated continuous wave (FMCW) technology. Such radar systems transmit chirp signals with linearly varying frequency. The reflected signal from an object (or objects) is mixed with the transmitted signal frequencies to generate a beat signal, which contains the range and Doppler information for object identification. The further away the object is from the transmitter in the vehicle, the greater the beat frequency. The higher the relative speed of the object to the vehicle, the higher the Doppler frequency. In addition, multiple transmit and receive antennas are often used to enhance the signal to noise ratio (SNR) and obtain the angle of the object relative to the vehicle.

Automotive radars are often classified into three groups—short range Radar (SRR), medium range Radar (MRR), and long range radar (LRR). In general, LRRs are designed to provide the highest range for object detection with smaller field of view (FOV) whereas SRRs provide the highest FOV with corresponding reduction in range of detected objects. The angular resolution depends on the number of antennas in the system. A typical SRR system uses 4 receive antennas and a typical LRR system uses 8 or more antennas. A typical MRR system may have either 4 or 8 antennas depending on the application of the system.

The signals received via the antennas are mixed with the transmitted signal frequencies, and the resulting beat signals (one per antenna) are filtered and converted to digital beat signals. Signal processing is then performed on the digitized beat signals to extract the range, velocity, and angle of potential objects in the view of the radar. The signal processing is typically performed in a central processing unit. The compute power and amount of memory needed to perform this centralized signal processing increases linearly with the number of antennas.

SUMMARY

Embodiments of the present disclosure relate to methods and apparatus for distributed radar signal processing in cascaded radar system. In one aspect, a cascaded radar system is provided that includes a first radar system-on-a-chip (SOC) including a first plurality of receive channels and a first signal processor component coupled to the first plurality of receive channels to perform a first initial portion of signal processing for object detection on digital beat signals generated by the first plurality of receive channels, a second radar SOC including a second plurality of receive channels and a second signal processor component coupled to the second plurality of receive channels to perform a second initial portion of signal processing for object detection on digital beat signals generated by the second plurality of receive channels, and a processing unit coupled to the first radar SOC and the second radar SOC to receive first results of the first initial portion of signal processing and second results of the second initial portion of signal, the processing unit operable to perform a remaining portion of the signal processing for object detection using the first results and the second results.

In one aspect, a method for distributed radar signal processing in a cascaded radar system is provided that includes performing a first initial portion of signal processing for object detection on digital beat signals generated by a first plurality of receive channels in a first radar system-on-a-chip (SOC) in the radar system, performing a second initial portion of signal processing for object detection on digital beat signals generated by a second plurality of receive channels in a second radar SOC in the radar system, and performing, by a processing unit in the radar system, a remaining portion of the signal processing for object detection using results of the first initial portion of signal processing and the second initial portion of signal processing.

In one aspect, a method for distributed radar signal processing in a cascaded radar system including a plurality of radar systems-on-a-chip (SOC) coupled to a processing unit is provided that includes performing an initial portion of signal processing for object detection in each radar SOC, and performing a remaining portion of the signal processing for object detection in the processing unit using results of performing the initial portion received from each of the radar SOCs.

BRIEF DESCRIPTION OF THE DRAWINGS

Particular embodiments will now be described, by way of example only, and with reference to the accompanying drawings:

FIG. 10 is a graph illustrating receiver operating characteristics curves for constant false alarm rate (CFAR) detection.

DETAILED DESCRIPTION OF EMBODIMENTS OF THE DISCLOSURE

Figure 1:
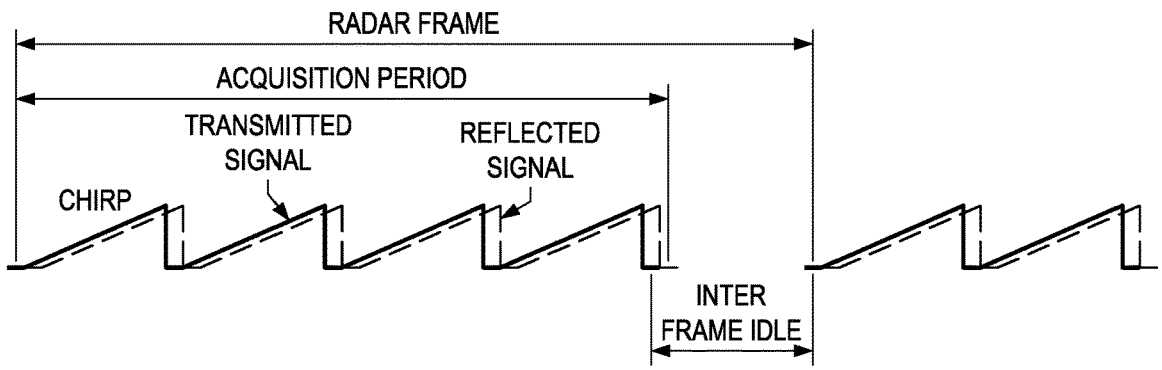
FIG. 1 is an example illustrating a frequency modulated continuous wave (FMCW) radar frame.

Specific embodiments of the disclosure will now be described in detail with reference to the accompanying figures. Like elements in the various figures are denoted by like reference numerals for consistency.

Referring to FIG. 1, in a typical frequency modulated continuous wave (FMCW) radar system, consecutive sequences of chirps are transmitted and received to generate radar signals. After each consecutive sequence of chirps, there is some idle time (inter-frame idle) to allow for processing the resulting radar signal. The acquisition time of a sequence of chirps and the subsequent inter-frame idle time form a radar frame. The reflected signal from each antenna is mixed with the transmitted signal frequencies to generate a beat signal that is filtered and digitized. Signal processing is then performed on the resulting digital beat signals (one per receiving antenna in the system) to extract the range, velocity, and angle of potential objects in the view of the radar.

Figure 2:
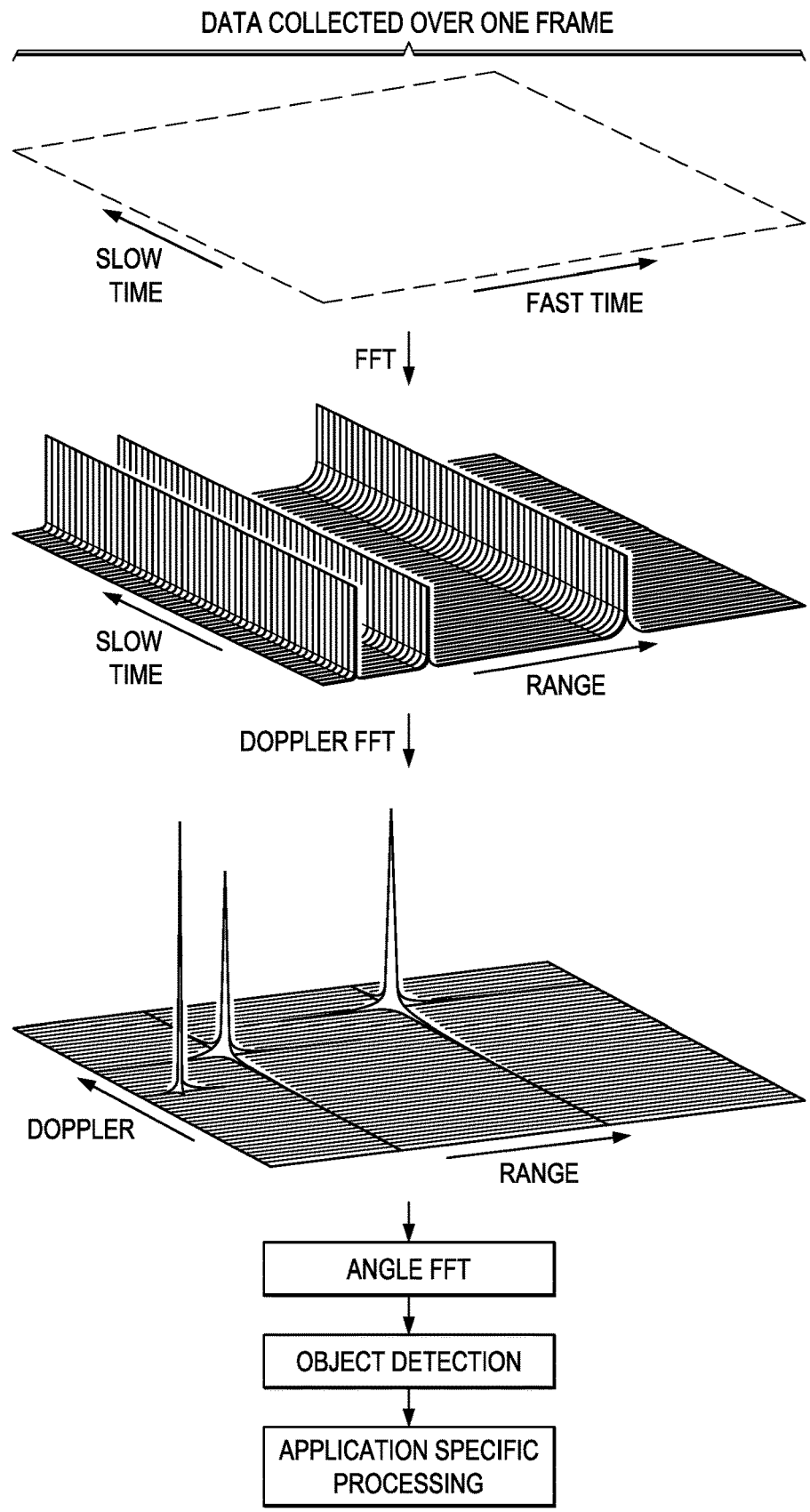
FIG. 2 is a flow diagram illustrating FMCW radar signal processing.

FIG. 2 illustrates an example flow of radar signal processing for one radar frame across multiple receive antennas. Note that the term "fast time" refers to time samples within a single chirp and the term "slow time" refers to the number of chirps in the chirp sequence. For each receive antenna, a range Fast Fourier Transform (FFT) is performed on the digitized samples of each reflected chirp to convert the data to the frequency domain. Peak values correspond to ranges (distances) of objects. This processing is usually performed in-line, meaning that the range FFT is performed on the digitized samples of a previous chirp while samples are being collected for the current chirp. The results of the range FFTs are saved in memory for further processing. There will be one set of range FFT results for each receive antenna. Note that if there are N time samples in a chirp, N range results are stored for the chirp. Thus, logically, if there are M chirps in the chirp sequence, an array of M×N range values is generated by the range FFTs. In this array, which may be referred to as the range-time array, the N columns are the range values for samples at the same relative time across the M chirps.

For each range, a Doppler FFT is performed over each of the corresponding range values of the chirps in the chirp sequence (slow time axis). That is, a Doppler FFT is performed on each of the N columns of the M×N array. The peaks in the resulting M×N range-Doppler plane, also referred to as a range-Doppler array or range-Doppler slice, correspond to the range and relative speed (velocity) of potential objects. There will be a range-Doppler array for each receive antenna.

Coherent integration is then performed across the range-Doppler arrays to determine angle information of the potential objects. When multiple receivers are used, the reflected signals will each have a different delay depending on the angle of an object reflecting the signal. For coherent integration, a third FFT, i.e., an angle FFT, is performed across the range-Doppler arrays for each antenna. Potential objects are detected by considering peaks in the range-Doppler-angle cubes. The information regarding the potential objects is then used for application specific processing such as object tracking, rate of movement of objects, direction of movement, etc. In the automotive context, the object data may be used, for example, for lane change assistance, parking, blind spot detection, rear collision alert, emergency braking, and cruise control.

The Doppler FFT and the angle FFT are typically performed during the idle time of a radar frame. The combination of the range FFT, the Doppler FFT, and the angle FFT may be referred to as a three dimension (3D) FFT.

Figure 3:
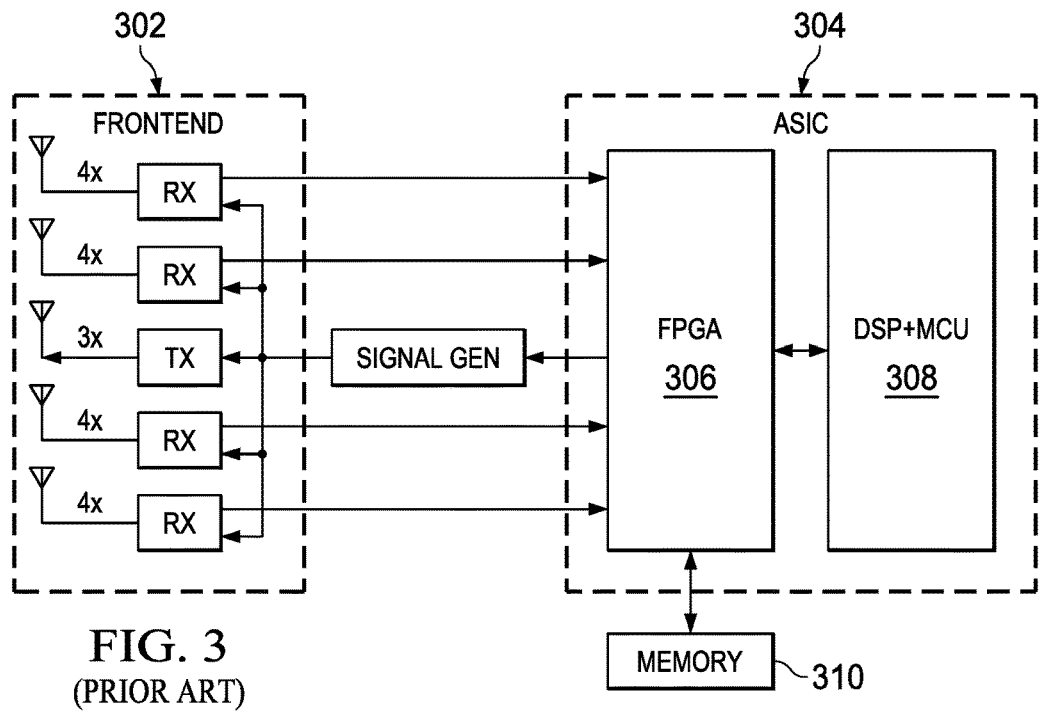
FIG. 3 is a block diagram of a prior art FMCW long range radar system.

FIG. 3 is a high level block diagram of an example prior art architecture for a long range FMCW radar system. This system includes a radar frontend 302 of four receiver (Rx) components and one transmitter (Tx) component coupled to an application specific integrated circuit (ASIC) 304. The ASIC 304 may include a field-programmable gate array 306 (or other application specific accelerator) and a DSP+MCU processor 308. The DSP+MCU processor 308 combines the functionality of a high-end digital signal processor (DSP) and a microcontroller (MCU). The transmitter component (Tx) has three antennas and three transmission channels. For each radar frame, one or more of the transmission channels transmits chirps generated by the signal generator under the control of the ASIC 304.

Each of the receiver components (Rx) has four antennas and four receive channels for receiving reflected chirps and generating digital beat signals. For each radar frame, the receiver components each generate four digital beat signals (one for each receive channel) and send the digital beat signal to the ASIC 304 for processing.

The ASIC 304 performs the above described signal processing on the sixteen digital beat signals. That is, for each of the sixteen signals, the ASIC 304 performs the range FFT on samples of each chirp and stores the results in the memory 310. Once all chirps are transmitted and the range FFTs completed, the ASIC 304 then performs the Doppler FFT and the angle FFT.

The memory 310 is typically external to the ASIC 304 as the amount of memory needed to store the intermediate processing results is quite large. For example, consider an example radar frame for an LRR system. There may be 512 samples per chirp and 128 chirps per frame. Given the sixteen receive antennas of this example architecture, the ASIC 304 needs to perform sixteen 512-point FFTs per chirp and save about 4 MB of intermediate data.

Embodiments of the disclosure provide for distributing the radar signal processing in a cascaded radar system such that the needed compute power of the radar system processing unit is reduced and the external memory is reduced and/or eliminated. More specifically, a radar system architecture and method for radar signal processing are provided that distribute the signal processing and the memory in the radar system.

Figure 4:
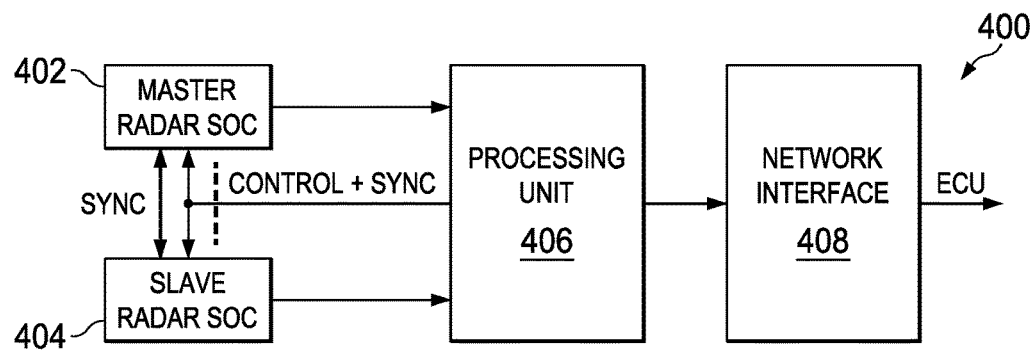
FIG. 4 is a block diagram of an example FMCW cascaded radar system.

FIG. 4 is a block diagram of an example cascaded FMCW radar system 400 configured to perform distributed radar signal processing. The example cascaded FMCW radar system 400 includes a master radar system-on-a-chip (SOC) 402, a slave radar SOC 404, a processing unit 406, and a network interface 408. The master radar SOC 402 and the slave radar SOC 404 each have the architecture of the example FMCW radar SOC of FIG. 5. Further, the master radar SOC 402 is coupled to the slave radar SOC 404 to synchronize the operation of the slave radar SOC 404 with that of the master radar SOC 402. The master radar SOC 402 and the slave radar SOC 404 are referred to collectively herein as the radar system frontend or the frontend.

The processing unit 406 is coupled to the master radar SOC 402 and the slave radar SOC 404 via a serial interface to receive data from the radar SOCs. In some embodiments, the serial interface may be a high speed serial interface such as a low-voltage differential signaling (LVDS) interface. In some embodiments, the serial interface may be lower speed serial peripheral interface (SPI). As is explained in more detail herein, each radar SOC 402, 404 includes functionality to perform part of the signal processing of radar signals received in the SOC, and to provide the results of this signal processing to the processing unit 406 via the serial interface. In some embodiments, each radar SOC 402, 404 performs the range FFT and the Doppler FFT for each radar frame. In some embodiments, each radar SOC 402, 404 further performs partial object detection based on the results of the Doppler FFT.

The processing unit 406 includes functionality to process the data received from the radar SOCs 402, 404 to complete any remaining signal processing to determine, for example, distance, velocity, and angle of any detected objects. The processing unit 406 may also include functionality to perform post processing of the information about the detected objects, such as tracking objects, determining rate and direction of movement, etc. The processing unit 406 may include any suitable processor or combination of processors as needed for the processing throughput of the application using the radar data. For example, the processing unit 406 may include a digital signal processor (DSP), a microcontroller (MCU), an SOC combining both DSP and MCU processing, or a floating point gate array (FPGA) and a DSP.

The processing unit 406 provides control information as needed to one or more electronic control units in the vehicle via the network interface 408. Electronic control unit (ECU) is a generic term for any embedded system in a vehicle that controls one or more the electrical system or subsystems in the vehicle. Types of ECU include, for example, electronic/ engine control module (ECM), powertrain control module (PCM), transmission control module (TCM), brake control module (BCM or EBCM), central control module (CCM), central timing module (CTM), general electronic module (GEM), body control module (BCM), and suspension control module (SCM).

The network interface 408 may implement any suitable protocol, such as, for example, the controller area network (CAN) protocol, the FlexRay protocol, or Ethernet protocol.

Figure 5:
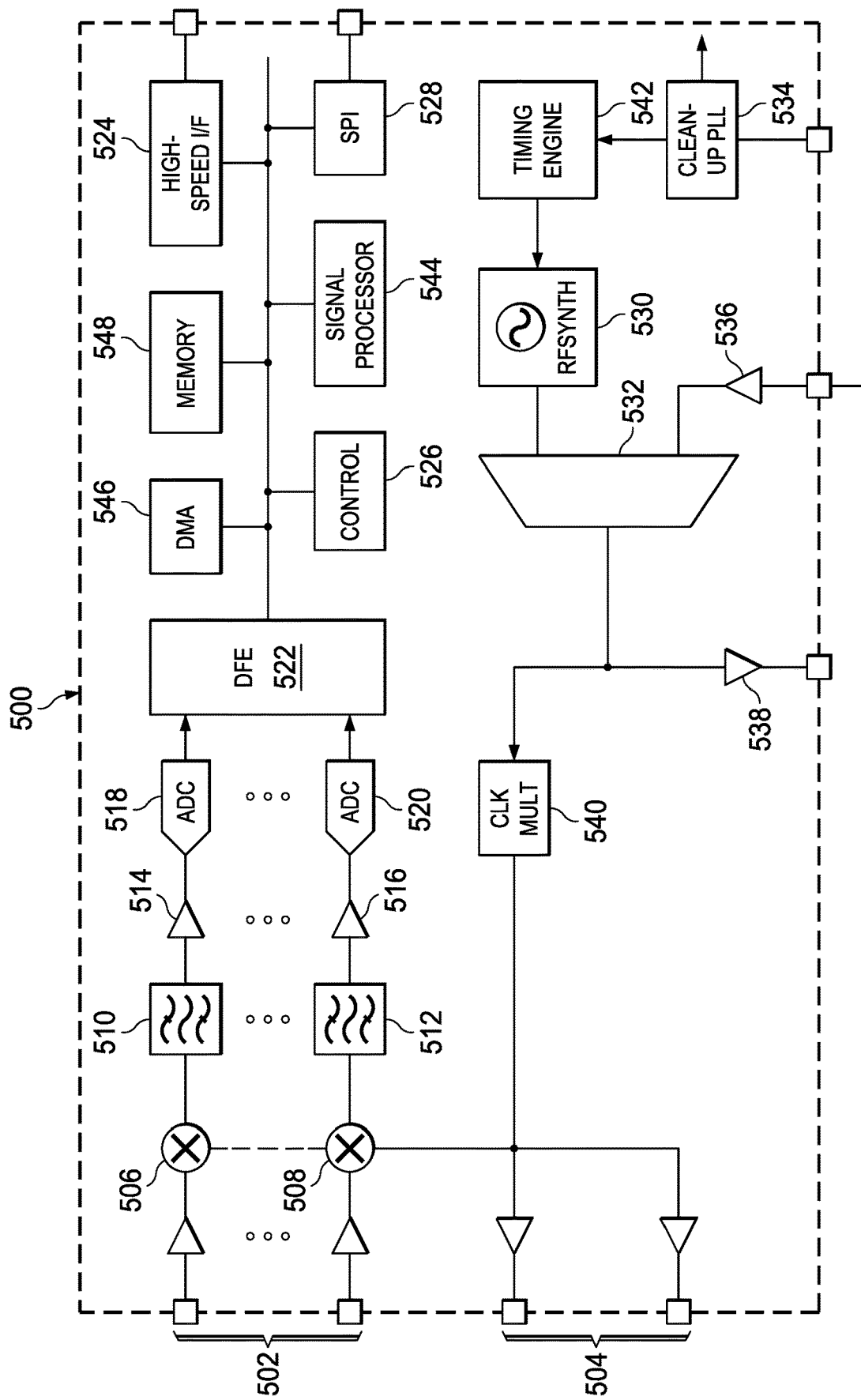
FIG. 5 is a block diagram of an example FMCW short range radar device.

FIG. 5 shows a block diagram of an example FMCW radar SOC 500 configured to be used as the master radar SOC 402 or the slave radar SOC 404 in the radar system 400. The radar SOC 500 may include multiple transmit channels 504 for transmitting FMCW signals and multiple receive channels 502 for receiving the reflected transmitted signals. Further, the number of receive channels may be larger than the number of transmit channels. For example, an embodiment of the radar SOC 500 may have two transmit channels and four receive channels. A transmit channel includes a suitable transmitter and antenna. A receive channel includes a suitable receiver and antenna. Further, each of the receive channels 502 are identical and include a mixer 506, 508 to mix the transmitted signal frequencies with the received signal to generate a beat signal (alternatively referred to as a dechirped signal, intermediate frequency (IF) signal, or raw radar signal), a baseband bandpass filter 510, 512 for filtering the beat signal, a variable gain amplifier (VGA) 514, 516 for amplifying the filtered beat signal, and an analog-to-digital converter (ADC) 518, 520 for converting the analog beat signal to a digital beat signal.

The receive channels 502 are coupled to a digital front end (DFE) 522 that performs decimation filtering on the digital beat signals to reduce the sampling rate and bring the signal back to baseband. The DFE 522 may also perform other operations on the digital beat signals, e.g., DC offset removal. The DFE 522 is coupled to the signal processor component 544 to transfer the output of the DFE 522 to the signal processor component 544.

The signal processor component 544 is configured to perform a portion of the signal processing on the beat signals of a radar frame and to provide the results of this signal processing to the processing unit 406. In some embodiments, the results are provided to the processing unit 406 via the high speed serial interface 524. In some embodiments, the results are provided via the serial peripheral interface (SPI) 528. In some embodiments, the signal processor component 544 may perform the range FFT and the Doppler FFT on each sequence of chirps in a radar frame. Such embodiments are explained in more detail in reference to method of FIG. 6. In some embodiments, the signal processor component 544 may also perform partial object detection based on the results of the Doppler FFT. Such embodiments are explained in more detail in reference to method of FIG. 9.

The signal processor component 544 may include any suitable processor or combination of processors. For example, the signal processor component 544 may be a digital signal processor, an MCU, an FFT engine, a DSP+ MCU processor, a field programmable gate array (FPGA), or an application specific integrated circuit (ASIC). Further, as is explained in more detail in reference to FIG. 6 and FIG. 9, the signal processor component 544 is coupled to memory 548 to store intermediate results of the portion of the signal processing performed on the beat signals.

The on-chip memory component 548 provides on-chip storage, e.g., a computer readable medium that may be used, for example, to communicate data between the various components of the SOC 500, to store software programs executed by processors on the SOC 500, etc. The on-chip memory component 548 may include any suitable combination of read-only memory and/or random access memory (RAM), e.g., static RAM. The direct memory access (DMA) component 546 is coupled to the memory component 548 to perform data transfers from the memory component 548 to the high speed interface 527 and/or the SPI 528.

The control component 526 includes functionality to control the operation of the radar SOC 500. The control component 526 may include, for example, an MCU that executes software to control the operation of the radar SOC 500.

The serial peripheral interface (SPI) 528 provides an interface for communication with the processing unit 406.

For example, the processing unit 406 may use the SPI 528 to send control information, e.g., timing and frequencies of chirps, output power level, triggering of monitoring functions such as phase noise monitoring, etc., to the radar SOC 500. As previously mentioned, in some embodiments, the radar SOC 500 may use the SPI 528 to send the results of the signal processing performed by the signal processor 544 to the processing unit 406.

The programmable timing engine 542 includes functionality to receive chirp parameter values for a sequence of chirps in a radar frame from the control module 526 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, an analog-to-digital (ADC) sampling time, a ramp end time, a transmitter start time, etc.

The radio frequency synthesizer (RFSYNTH) 530 includes functionality to generate FMCW signals for transmission based on chirp control signals from the timing engine 542. In some embodiments, the RFSYNTH 530 includes a phase locked loop (PLL) with a voltage controlled oscillator (VCO). If the radar SOC 500 is used as the slave radar SOC 404, the RFSYNTH 530 is not active when the radar system frontend is operating in normal mode. Instead, the RFSYNTH 530 in the master radar SOC 402 provides the FMCW signals to be transmitted to the slave radar SOC 404 via the input buffer 536.

The multiplexer 532 is coupled to the RFSYNTH 530 and the input buffer 536. The multiplexer 532 is configurable to select between signals received in the input buffer 536 and signals generated by the RFSYNTH 530. The output buffer 538 is coupled to the multiplexer 532 and may be used, for example, to transmit signals selected by the multiplexer 532 to the input buffer of another radar SOC. For example, the output buffer 538 of the master radar SOC 402 is coupled to the input buffer 536 of the slave radar SOC 402 to send signals from the RFSYNTH 530 of the master radar SOC 402 to the slave radar SOC 404. Further, the multiplexer 532 of the slave radar SOC 404 is configured to select the signals received in the input buffer 536.

The clock multiplier 540 increases the frequency from multiplexer 532 and applies the increased frequency to transmit channels 504 and mixers 506, 508. The clean-up PLL (phase locked loop) 534 operates to increase the frequency of the signal of an external low frequency reference clock (not shown) to the frequency of the RFSYNTH 534 and to filter the reference clock phase noise out of the clock signal.

Figure 6:
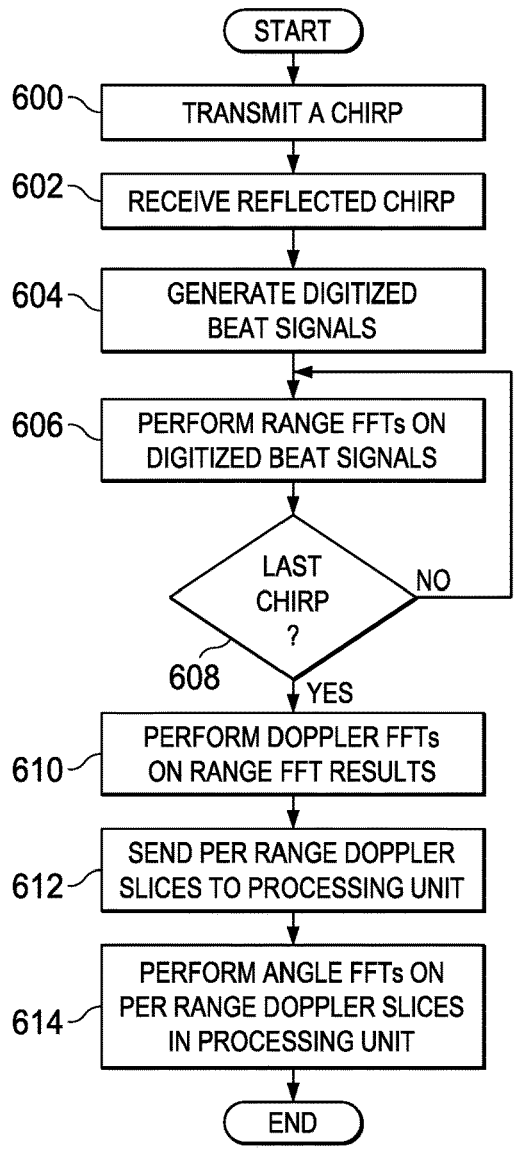
FIG. 6 is a flow diagram of a method for distributed signal processing of radar signals.

FIG. 6 is a flow diagram of a method for distributing the signal processing of a radar frame in a cascaded radar system such as that of FIGS. 4 and 5. In particular, in this method, an initial part of the signal processing for object detection, i.e., the first two FFTs of the 3D FFT performed as the basis for object detection, is performed in the radar SOCs of the cascaded radar system and the remaining signal processing is performed by the processing unit. For simplicity of explanation, the method is described in reference to the two SOC architecture of FIG. 4 and the radar SOC of FIG. 5. One of ordinary skill in the art will understand embodiments in which the cascaded radar architecture includes more radar SOCs. Further, the method is explained assuming that each radar SOC has four receive channels. One of ordinary skill in the art will understand embodiments in which the radar SOCs may have more, fewer, and or even differing numbers of receive channels.

As shown in FIG. 6, a chirp in the sequence of chirps in the radar frame is transmitted 600 in each of the radar SOCs 402, 404, and the reflected chirp is received 602 in each of the four receive channels of the radar SOCs 402, 404. A digital beat signal of the reflected chirp is generated 604 in each of the receive channels. That is, the reflected chirp is filtered, amplified, and converted to a digital signal in each of the receive channels.

Range FFTs are then performed 606 on the digital beat signals in each of the radar SOCs 402, 404. More specifically, the signal processors 544 of each of the radar SOCs 402, 404 perform four range FFTs, one on each of the digital beat signals, and store the results in memory 548 on the respective radar SOC. The process of transmitting 600 a chirp, receiving 602 the reflected chirp, generating 604 digital beat signals, and performing 606 range FFTs is repeated until all chirps 608 in the chirp sequence have been transmitted.

Once all of the chirps in the chirp sequence have been processed, memory 548 on each radar SOC 402, 404 is storing four arrays of M×N range values, where M is the number of chirps in the chirp sequence and N is the number of time samples for receiving a chirp. Doppler FFTs are performed 610 on the range FFT results in each of the radar SOCs 402, 404. As previously mentioned, a Doppler FFT is performed over the range results of corresponding times samples of the reflected chirps received in the four receive channels, i.e., on each of the N columns of the four M×N range-time arrays. The output of each Doppler FFT is an M×N range-Doppler slice. However, there is no need to store a full M×N range-Doppler slice in memory. Each signal processor module 544 of each of the radar SOCs 402, 404 generates four Doppler slices corresponding to the four receive channels for each range one at a time.

The Doppler slices generated for a given range by each of the radar SOCs 402, 404 are sent 612 to the processing unit 406 for the remainder of the signal processing before generating the four Doppler slices for the next range. Angle FFTs are performed 614 by the processing unit 406 on corresponding Doppler slices for a given range received from the radar SOCs 402, 404 to complete the signal processing needed for object detection for the particular range. Thus, the processing unit 406 does not need memory to store full range-Doppler data from all the radar SOCs 402, 404 as in the prior art.

Figure 7:
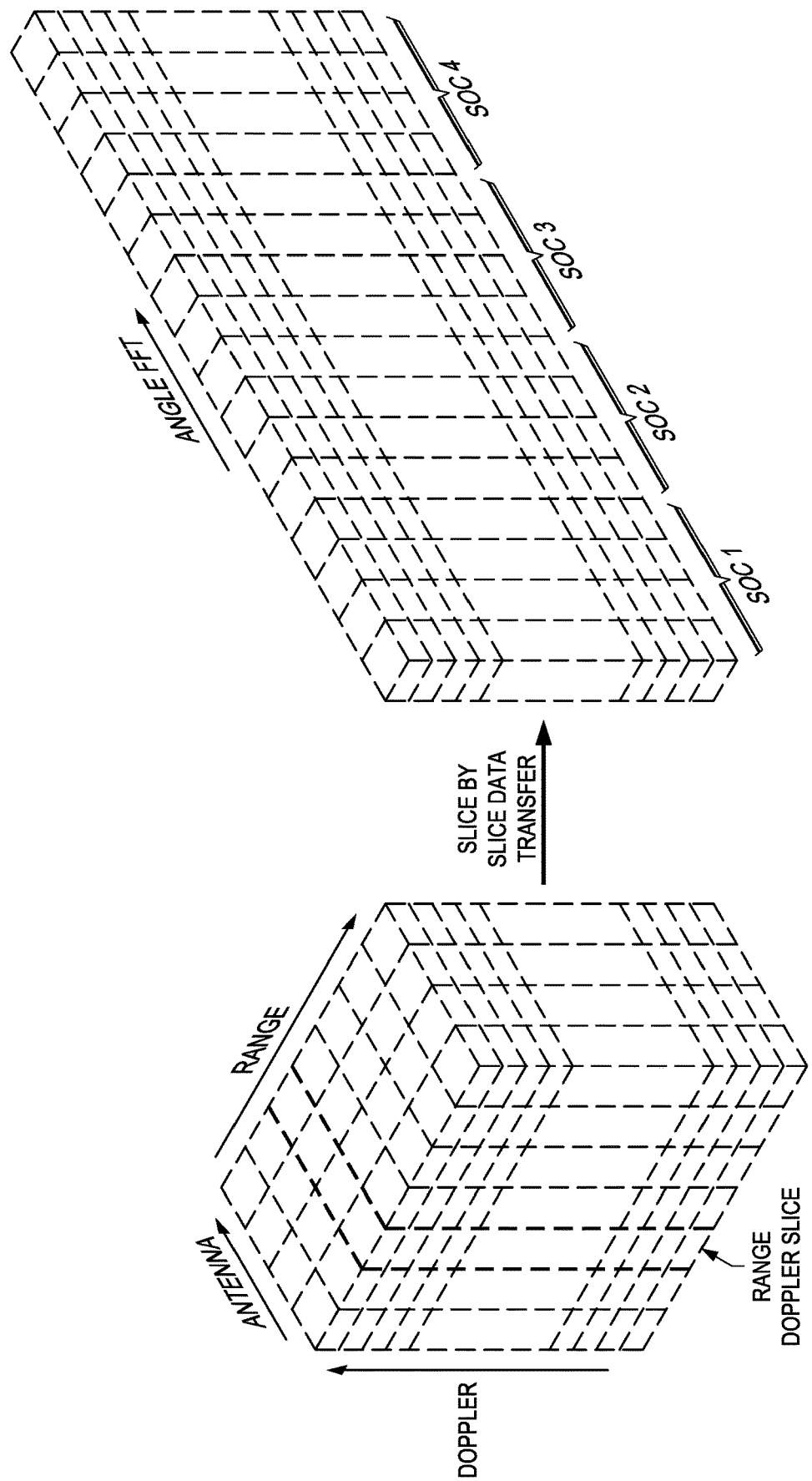
FIG. 7 is an example illustrating distributed signal processing of radar data.

FIG. 7 is an example illustrating the distributed radar signal processing of this method. FIG. 7 shows an example range-Doppler-channel cube for one radar SOC assuming four receive channels (antenna) and a full per range Doppler slice for all channels across four radar SOCs with four receive channels each. The range and Doppler FFTs of the range-Doppler-channel cube are performed in each radar SOC to generate range-Doppler slices for each receive channel. These data slices are then transferred to the processing unit range by range. The processing unit performs the angle FFT across sixteen corresponding per range Doppler slices, four from each of the four radar SOCs.

Figure 8:
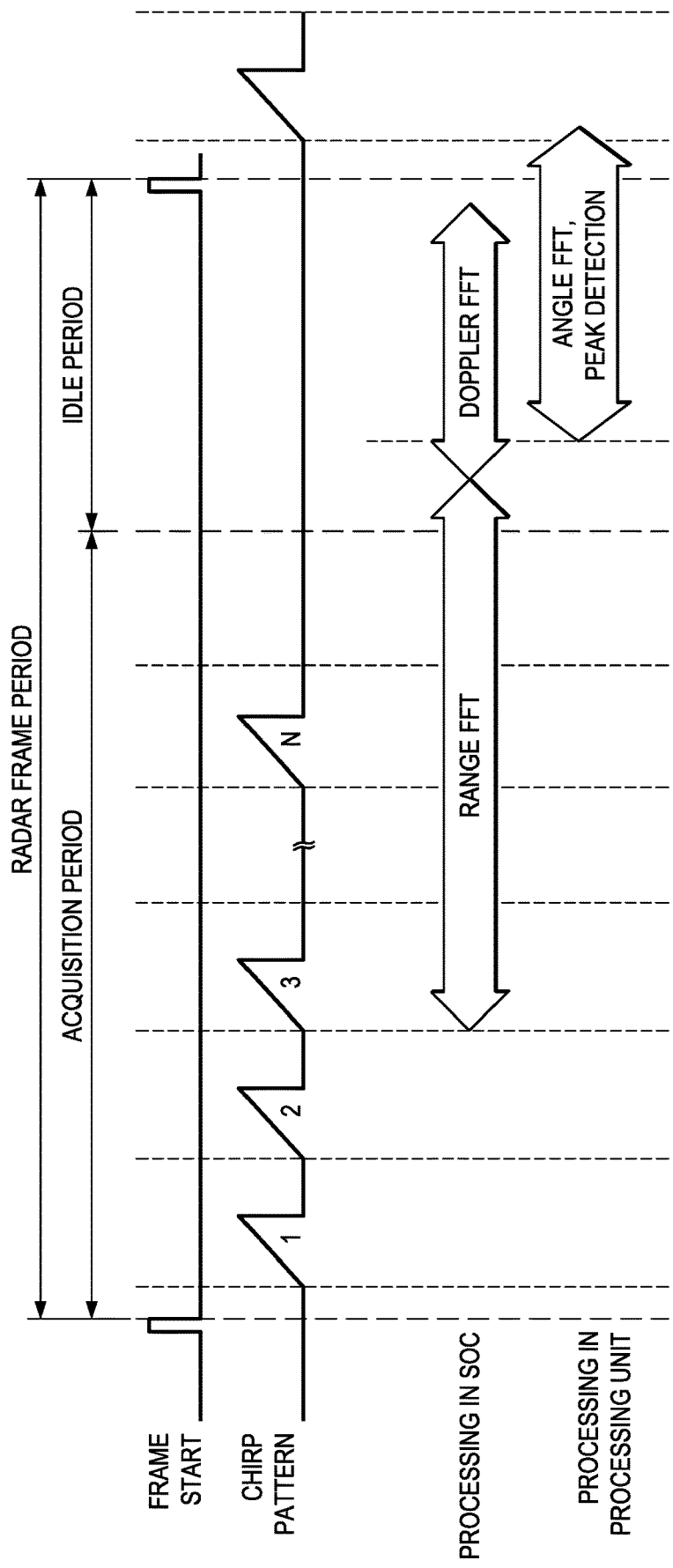
FIG. 8 is a timing diagram illustrating and example timing of distributed signal processing for a radar frame.

FIG. 8 is a timing diagram illustrating timing of the distributed radar signal processing for a radar frame in accordance with an embodiment of the method of FIG. 8. As shown in this diagram, the processing may be performed in a pipelined fashion. The computation of the range FFTs for the digital reflected chirps (digital beat signals) in a radar SOC may be performed concurrently with the transmission of chirps and the generation of the corresponding digital beat signals. That is, the range FFT for one beat signal may be computed while a subsequent reflected chip is being processed in a receive channel to generate a digital beat signal, and a subsequent chirp in the sequence of chirps is being transmitted. Most of the range FFTs may be performed in a radar SOC during the acquisition period of the radar frame. Note that there is a pipeline delay from the beginning of the acquisition period due to the time needed to generate the digital beat signal for the first reflected chirp in a receive channel. Thus, the last two range FFTs are computed after the end of the acquisition period.

The computation of the Doppler FFTs in a radar SOC occurs during the radar frame idle period and begins once all of the range FFTs are computed. The computation of the angle FFTs in the processing unit may be performed concurrently with the computation of the Doppler FFTs as the Doppler FFT results are sent slice by slice to the processing unit.

Using the method of FIG. 6 in a cascaded radar system may require a high speed serial interface between the radar SOCs and the processing unit for the transfer of the range-Doppler channel data. Moving additional radar signal processing to the radar SOCs can reduce the amount of data that needs to be transferred, and thus allow the use of a slower serial interface such as an SPI.

Figure 9:
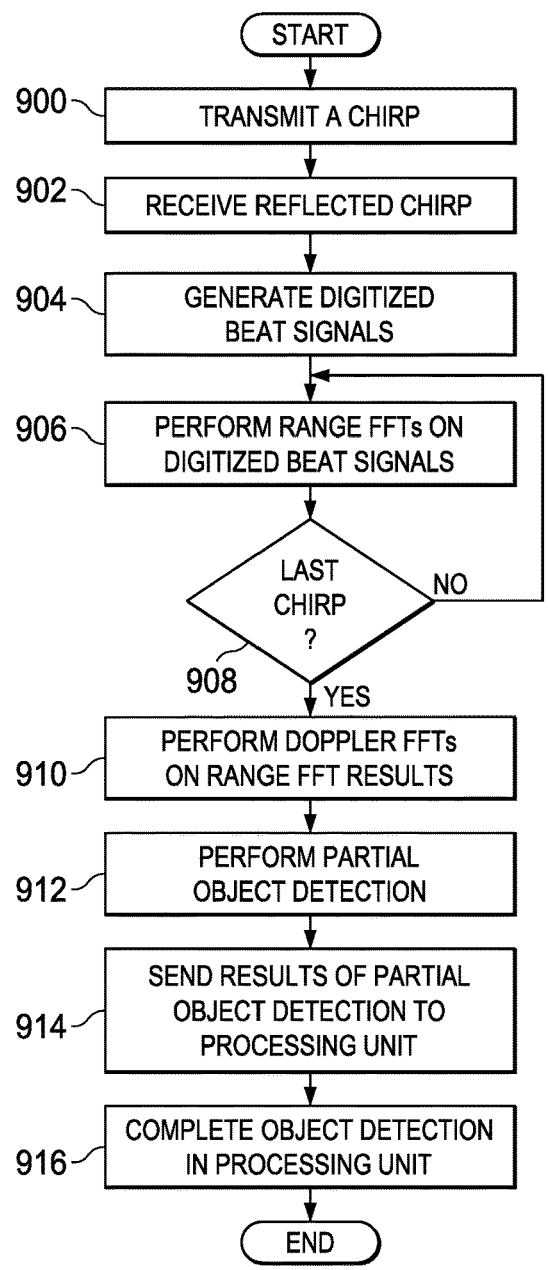
FIG. 9 is a flow diagram of a method for distributed signal processing of radar signals.

FIG. 9 is a flow diagram of a method for distributing the signal processing of a radar frame in a cascaded radar system such as that of FIGS. 4 and 5. In particular, in this method, the initial part of the signal processing performed in the radar SOCs of the cascaded radar systems includes the range and Doppler FFTs and partial object detection. Data regarding any partially detected objects is transferred to the processing unit and the remaining signal processing to complete the object detection is performed by the processing unit. For simplicity of explanation, the method is described in reference to the two SOC architecture of FIG. 4 and the radar SOC of FIG. 5. One of ordinary skill in the art will understand embodiments in which the cascaded radar architecture includes more radar SOCs. Further, the method is explained assuming that each radar SOC has four receive channels. One of ordinary skill in the art will understand embodiments in which the radar SOCs may have more, fewer, and or even differing numbers of receive channels.

As shown in FIG. 9, steps 900-910 are the same as the corresponding previously described steps 600-610 of the method of FIG. 6. Once the Doppler FFTs are computed, partial object detection is performed 912 by the signal processor module 544 of each of the radar SOCs 402, 404. This partial object detection may be performed using a relaxed version of constant false alarm rate (CFAR) object detection.

In general, in CFAR object detection, detection of an object is based on the power of the signal received in a receiver channel. The power of the signal is compared to a power threshold to decide whether or not the reflected signal can be considered to probably originate from an object. If this threshold is too low, then more objects will be detected at the expense of increased numbers of false alarms. Conversely, if the threshold is too high, then fewer objects will be detected, but the number of false alarms will also be low. In a typical radar system, the threshold is set in order to achieve a required probability of false alarm (PFA) (or equivalently, false alarm rate or time between false alarms). The value of the threshold may be adapted to account for interference sources that affect the level of noise in received signals.

In some known simple CFAR detection schemes, the threshold level is calculated by estimating the level of the noise floor around the cell under test (CUT). For this method, a cell corresponds to a sequence of chirps in a radar frame. This noise level estimation can be determined by taking a block of cells around the CUT and calculating the average power level. To avoid corrupting this estimate with power from the CUT itself, cells immediately adjacent to the CUT are normally ignored (and referred to as "guard cells"). An object is declared present in the CUT if the power of the CUT is both greater than that of the adjacent cells and greater than the local average power level. The estimate of the local power level may sometimes be increased slightly to allow for a limited sample size. This simple approach is called a cell-averaging CFAR (CA-CFAR).

Other related approaches calculate separate averages for the cells to the left and right of the CUT, and then use the greatest-of or least-of these two power levels to define the local power level. These are referred to as greatest-of CFAR (GO-CFAR) and least-of CFAR (LO-CFAR) respectively, and can improve detection when immediately adjacent to areas of clutter.

In prior art radar systems such as that of FIG. 3 and when the method of FIG. 6 is used in the radar system of FIG. 4, the CFAR object detection may performed in the respective ASIC or processing unit based on a fully coherent FFT across all the receiver channels, i.e., by performing the third FFT of the radar signal processing.

For partial object detection in each of the radar SOCs 402, 404, a more relaxed object detection threshold may be used than would be used for the fully coherent detection. The radar SOCs 402, 404 should operate at a higher false alarm rate with corresponding higher detection probability than the desired false alarm rate for the radar system 400. In other words, each radar SOC will likely detect more objects than are actually present. In some embodiments, the operating false alarm rate (threshold) for each radar SOC 402, 404 is set to correspond to a three decibel lower signal-to-noise ratio (SNR) than the desired system false alarm rate.

FIG. 10 is a graph illustrating this choice of false alarm rates. The graph shows example receiver operating characteristics curves with varying SNRs. In general, a desired false alarm rate is chosen for the system, and depending on the SNR at a given point, this false alarm rate defines the probability of correct object detection. The operating false alarm rate for the radar SOCs is chosen to decrease the probability of correct object detection to allow for relaxed object detection in the radar SOCs.

Referring again to FIG. 9, in some embodiments, the partial object detection is based on non-coherent integration. That is, the power is added across the four receive channels in a radar SOC and the result is compared to the relaxed object detection threshold.

It is well known that there is a slight loss of SNR (signal-to-noise ratio) between coherent and non-coherent detection. For example, for a system with eight antennas, performing non-coherent (power based) object detection results in about 1 dB loss as compared to coherent (FFT based) detection. Accordingly, in some embodiments, the partial object detection is based on partially coherent power addition. For example, if there are eight antennas on two SOCs, a sixteen point FFT can be performed at each range and Doppler as per the equation below.

$$X_k = x_0 + x_1 e^{-\frac{2\pi}{16}k} + x_2 e^{-\frac{2\pi}{16}2k} + x_3 e^{-\frac{2\pi}{16}3k} + x_4 e^{-\frac{2\pi}{16}4k} + x_5 e^{-\frac{2\pi}{16}5k} +$$
$$x_6 e^{-\frac{2\pi}{16}6k} + x_7 e^{-\frac{2\pi}{16}7k}$$
$$= x_0 + x_1 e^{-\frac{2\pi}{16}k} + x_2 e^{-\frac{2\pi}{16}2k} + x_3 e^{-\frac{2\pi}{16}3k} + e^{-\frac{2\pi}{16}4k}$$
$$\left( x_4 + x_5 e^{-\frac{2\pi}{16}k} + x_6 e^{-\frac{2\pi}{16}2k} + x_7 e^{-\frac{2\pi}{16}3k} \right)$$

In the above equation, $x_0$ through $x_3$ are the receiver channels in the radar SOC 402 and $x_4$ through $x_7$ are the receiver channels in the radar SOC 404. The second line of the equation shows that inherent to this coherent detection is the coherent sum over four receiver channels. Thus, partial coherent power sums in each radar SOC (which may be a zero-padded sixteen point FFT over the four receive channels) may be used for partial object detection. That is, the power is determined with the FFT across the four receive channels in a radar SOC and the result is compared to the relaxed objection detection threshold.

The result of the partial object detection 912 in each of the radar SOCs may be a set of detected objects. Each SOC sends 914 the result of the partial object detection to the processing unit 406. The data sent for each detected object may include the range and Doppler index identifying the bin in a per range Doppler slice at which the power crossed the threshold, the FFT outputs for all the receiver channels at the identified bin, and the estimated noise variance used in determining the threshold.

The object detection is then completed 916 in the processing unit 406. More specifically, the processing unit 406 will filter the sets of detected objects such that the desired system false alarm rate is achieved. As previously mentioned, the radar SOCs 402, 404 use a relaxed object detection threshold and thus may detect more objects than are actually present in the scene. All necessary information including the range-Doppler FFT values over all the channels and the estimated noise values is received by the processing unit 406 from the SOCs 402, 404. The processing unit 406 performs the full third dimension FFT, i.e., the angle FFT, for each object in the final set of detected objects. Thus, the processing unit 406 can estimate the angle of arrival more accurately than each of the SOCs 402, 404. In addition, the processing unit 406 can combine the noise values from SOCs 402, 404 and apply a final, stricter threshold to eliminate false objects and bring the false alarm rate to the desired level.

Note that the amount of data communicated for the detected objects in the above method should be much less than the total number of points in the range-Doppler-angle cube. Thus, this method reduces the throughput requirement between the radar SOCs and the processing unit. This reduction may be sufficient to allow a generic low speed serial bus between the radar SOCs and the processing unit. It may also reduce the compute power needed for the radar signal processing in the processing unit.

OTHER EMBODIMENTS

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in a cascaded radar system includes two radar SOCs. One of ordinary skill in the art will understand embodiments in which a cascaded radar system includes more than two SOCs.

In another example, embodiments have been described herein in which the radar SOCs in the front end of the cascaded radar system have a master slave relationship. One of ordinary skill in the art will understand embodiments in which the radar SOCs do not have a master slave relationship, e.g., an external PLL is used to provide FMCW signals to all of the SOCs.

In another example, embodiments have been described herein in which specific parts of the radar signal processing are performed in the radar SOCs and the remaining signal processing is performed by a processing unit receiving results from the radar SOCs. One of ordinary skill in the art will understand embodiments in which the distribution of the signal processing between the radar SOCs and the processing unit differs from the examples described herein.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A system comprising:
   a first radar system-on-a-chip (SOC) comprising a first receiver and first processor, the first processor coupled to the first receiver and configured to:
   detect a first beat signal on the first receive channel;
   generate a first digitized beat signal from the first beat signal;
   a second radar SOC comprising a second receiver and a second processor, the second processor coupled to the second receiver and configured to:
   detect a second beat signal on the second receive channel; and
   generate a second digitized beat signal from the second beat signal; and
   a processing unit coupled to the first radar SOC and the second radar SOC, the processing unit configured to perform angle fast Fourier transforms (FFTs) using the first digitized beat signal and the second digitized beat signal.

2. The system of claim 1, wherein:

the first processor is configured to compute a first range FFT using the first digitized beat signal; and the second processor is configured to compute a second range FFT using the second digitized beat signal.

3. The system of claim 2, wherein:

the first processor is configured to compute a first Doppler FFT using the first range FFT; and the second processor is configured to compute a second Doppler FFT using the second range FFT.

4. The system of claim 3, wherein:

the first processor is configured to compute a first angle FFT using the first Doppler FFT; and the second processor is configured to compute a second angle FFT using the second Doppler FFT.

5. The system of claim 1, in which the first radar SOC is a master radar SOC and the second radar SOC is a slave radar SOC.

6. A method comprising:

detect a first beat signal on a first radar system-on-a-chip (SOC);

generate a first digitized beat signal from the first beat signal;

detect a second beat signal on a second radar SOC;

generate a second digitized beat signal from the second beat signal; and performing, by a processing unit, angle fast Fourier transforms (FFTs) using the first digitized beat signal and the second digitized beat signal.

7. The method of claim 6, further comprising:

computing a first range FFT using the first digitized beat signal; and computing a second range FFT using the second digitized beat signal.

8. The method of claim 7, further comprising:

computing a first Doppler FFT using the first range FFT; and computing a second Doppler FFT using the second range FFT.

9. The method of claim 8, computing a first angle FFT using the first Doppler FFT; and computing a second angle FFT using the second Doppler FFT.

10. The method of claim 6, in which the first radar SOC is a master radar SOC and the second radar SOC is a slave radar SOC.

* * * * *